(12) United States Patent
Templeton et al.

(10) Patent No.: US 12,723,499 B2
(45) Date of Patent: Sep. 1, 2026

(54) ELECTRICAL STIMULATION OF HYDROGEN-PRODUCING ROCKS AND RESERVOIRS

(71) Applicant: Eden GeoPower, Inc., Somerville, MA (US)

(72) Inventors: Alexis Templeton, Boulder, CO (US); William Aertker, Denver, CO (US); Rafael Villamor-Lora, Brookline, MA (US); Vikas Agrawal, Medford, MA (US); Jacob Newmark, Somerville, MA (US)

(73) Assignee: Eden GeoPower, Inc., Somerville, MA (US)

( * ) Notice: Subject to any disclaimer, the term of this patent is extended or adjusted under 35 U.S.C. 154(b) by 0 days.

(21) Appl. No.: 18/753,014

(22) Filed: Jun. 25, 2024

(65) Prior Publication Data

US 2024/0426198 A1 Dec. 26, 2024

Related U.S. Application Data

(60) Provisional application No. 63/567,187, filed on Mar. 19, 2024, provisional application No. 63/510,220, filed on Jun. 26, 2023.

(51) Int. Cl.

| | |
|---|---|
| ***E21B 43/20*** | (2006.01) |
| ***C01B 3/06*** | (2026.01) |
| ***C09K 8/70*** | (2006.01) |
| ***E21B 43/26*** | (2006.01) |

(52) U.S. Cl.
CPC ................ *E21B 43/20* (2013.01); *C01B 3/06* (2013.01); *C09K 8/70* (2013.01); *E21B 43/26* (2013.01)

(58) Field of Classification Search
CPC ...... E21B 43/20; E21B 43/26; E21B 43/2605; C01B 3/06; C09K 8/70; Y02E 60/36
See application file for complete search history.

(56) References Cited

U.S. PATENT DOCUMENTS

| | | | | |
|---|---|---|---|---|
| 11,091,991 | B1 | 8/2021 | Mehrvand et al. | |
| 11,649,710 | B2 | 5/2023 | Alali et al. | |
| 11,788,394 | B2 | 10/2023 | Mehrvand et al. | |
| 2012/0085535 | A1 * | 4/2012 | Mo | E21B 43/2401 166/302 |
| 2014/0190691 | A1 * | 7/2014 | Vinegar | C10G 9/24 166/272.1 |
| 2021/0198991 | A1 | 7/2021 | Al-Mulhem et al. | |
| 2023/0050823 | A1 * | 2/2023 | Darrah | C09K 8/72 |
| 2023/0085175 | A1 | 3/2023 | Smalls et al. | |

OTHER PUBLICATIONS

International Search Report and Written Opinion mailed Oct. 23, 2024 in connection with International Application No. PCT/US2024/035358.

Bak et al., Production of reactive oxygen species from abraded silicates. Implications for the reactivity of the Martian soil. Earth and Planetary Science Letters, Jun. 21, 2017;473:113-21.

(Continued)

*Primary Examiner* — James G Sayre

(74) *Attorney, Agent, or Firm* — Wolf, Greenfield & Sacks, P.C.

(57) ABSTRACT

Methods for producing and extracting geologic hydrogen from rock formations, and related systems, are generally disclosed.

21 Claims, 6 Drawing Sheets

(56) References Cited

OTHER PUBLICATIONS

Damm et al., Kinetics of radical formation during the mechanical activation of quartz. Langmuir. Feb. 17, 2009;25(4):2264-70.
Delogu, Hydrogen generation by mechanochemical reaction of quartz powders in water. International Journal of Hydrogen Energy, Sep. 25, 2011;36(23):15145-52.
Ellison et al., Low-Temperature Hydrogen Formation During Aqueous Alteration of Serpentinized Peridotite in the Samail Ophiolite. J. of Geophysical Research: Solid Earth, Mar. 2, 2021;126:e2021JB021981(1-25). https://doi.org/10.1029/2021JB021981.
Kameda et al., Mechanisms of hydrogen generation during the mechanochemical treatment of biotite within $D_2O$ media. Earth Planets Space, Nov. 16, 2004;56:1241-5.
Kita et al., H2 generation by reaction between H2O and crushed rock: an experimental study on H2 degassing from the active fault zone. Journal of Geophysical Research: Solid Earth, Dec. 10, 1982;87(B13):10789-95.
Klein et al., Compositional controls on hydrogen generation during serpentinization of ultramafic rocks. Lithos, Mar. 27, 2013;178:55-69.
Mccollom et al., Hydrogen generation and iron partitioning during experimental serpentinization of an olivine-pyroxene mixture. Geochimica et Cosmochimica Acta, Aug. 1, 2020;282: 55-75. https://doi.org/10.1016/j.gca.2020.05.016.
Mccollom et al., Thermodynamic constraints on hydrogen generation during serpentinization of ultramafic rocks. Geochimica et Cosmochimica Acta, 2009;73(3):856-75. Epub: Nov. 8, 2008.
Mitchell, Hydrogen production from mechanically-activated basalt under experimental conditions simulating subglacial environments. Doctoral dissertation, Montana State University-Bozeman. May 2019:p(1-112).
Narayanasamy et al., Mechanism of hydroxyl radical generation from a silica surface: Molecular orbital calculations. Journal of Physical Chemistry B, Nov. 2005;109(46):21796-807.
Osselin et al., Orange hydrogen is the new green. Nature Geoscience. Oct. 2022;15:765-9.
Parkes et al., Rock-crushing derived hydrogen directly supports a methanogenic community: significance for the deep biosphere. Environmental Microbiology Reports, Apr. 2019;11(2):165-72.
Prinzhofer et al., Discovery of a large accumulation of natural hydrogen in Bourakebougou (Mali). International Journal of Hydrogen Energy, Sep. 25, 2018;43(42):19315-26.
Sugisaki et al., Origin of Hydrogen and Carbon Dioxide in Fault Gases and Its Relation to Fault Activity. The Journal of Geology, May 1983;91(3):239-58.
Telling et al. Rock comminution as a source of hydrogen for subglacial ecosystems. Nature Geoscience, Nov. 2015;8(11):851-5.
Yedinak, E. M. (2022). The Curious Case of Geologic Hydrogen: Assessing Its Potential As A Near-Term Clean Energy Source. Joule, Mar. 16, 2022;6(3):503-8.

* cited by examiner

ELECTRICAL STIMULATION OF HYDROGEN-PRODUCING ROCKS AND RESERVOIRS

CROSS-REFERENCE TO RELATED APPLICATIONS

This application claims the benefit of priority under 35 U.S.C. 119(e) of U.S. Application Ser. No. 63/567,187, filed Mar. 19, 2024, and U.S. Application Ser. No. 63/510,220, filed Jun. 26, 2023, the disclosures of which are incorporated herein by reference in their entirety.

FIELD

Disclosed embodiments are related to producing and extracting geologic hydrogen.

BACKGROUND

Molecular hydrogen is important in many industrial processes, such as the Haber-Bosch process, which produces ammonia from elemental nitrogen ($N_2$) and elemental hydrogen ($H_2$). Hydrogen also represents an emerging source of so-called green energy, as the byproducts of the combustion of elemental hydrogen are carbon neutral (i.e., $H_2O$). Currently, most of the hydrogen on the market is generated from energy-intensive manufacturing processes. However, naturally occurring geologic hydrogen has the potential to provide a low-cost and abundant source of hydrogen that could help accelerate the transition to carbon-neutral energy sources.

Geologic hydrogen can be generated by subterranean serpentinization or iron oxidation processes, typically occurring where water circulates within iron-containing geologic formations. The process can be stimulated by drilling and injecting water into target formations, generating what the industry calls "orange hydrogen"—the term originating from the color of the water containing the extracted hydrogen and small amounts of iron oxide, the latter of which gives the water a characteristic orange color. Geologic hydrogen can also occur naturally as a result of the processes that formed the Earth over billions of years ago, or through radiolysis reactions that break down water and produce hydrogen gas over geological time scales.

Other processes can generate hydrogen naturally, such as radiolysis and primordial hydrogen.

Certain silicon-bearing formations can also generate hydrogen. The reaction between water and Si radicals (e.g., Si—O) formed on fresh rock surfaces from breaking Si—O—Si bonds during rock shearing between 0-270° C. has been known to generate hydrogen. The reaction can be broadly described as Si+water to produce SiOH+hydrogen.

The challenge for the commercial-scale production of geologic hydrogen is that geologic formations containing geologic hydrogen, or rocks ready to react with fluids to produce hydrogen, are relatively impermeable, making it difficult, if not impossible to inject fluids into these geologic formations. The limited fluid-rock interaction impedes serpentinization and iron oxidation processes, as well as the release of stored gas. Additionally, the serpentinization reaction kinetics depends on temperature, which constrains geologic hydrogen production to thermally perturbed crust due to high-temperature gradients, such as hydrothermally-active regions. Accordingly, improved systems and methods for producing and extracting geologic hydrogen are desirable.

SUMMARY

In one aspect, a method for extracting geologic hydrogen, the method comprising injecting fluid into a subterranean formation; applying a current to the fluid and/or the rock within the subterranean formation; fracturing the subterranean formation; circulating a fluid, and extracting hydrogen from the subterranean formation.

In another aspect, a method for extracting geologic hydrogen, the method comprising: injecting a fluid comprising carbon dioxide into a subterranean formation; applying a current to the fluid within the subterranean formation; depositing at least portion of the carbon dioxide of the fluid into the subterranean formation; and extracting hydrogen from the subterranean formation.

In a different aspect, a method for forming hydrogen, the method comprising applying current to rock tailings immersed in a fluid to heat the rock tailings and fluid to a hydrogen production temperature; generating hydrogen; and extracting the hydrogen from the rock tailings.

In another aspect, a method for generating and extracting geologic hydrogen, the method comprising: applying a current to a subterranean formation; forming silicon radicals and/or siloxy radicals in the fractures of the subterranean formation; and reacting water with the silicon and/or siloxy radicals to generate hydrogen from the subterranean formation; and extracting the hydrogen from the subterranean formation.

In another aspect, a system is described, the system comprising a power source; at least two electrodes connected to the power source; at least one pump; and at least one processor configured to operate the power source and the at least one pump to perform the method of any one of the preceding embodiments.

BRIEF DESCRIPTION OF THE DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
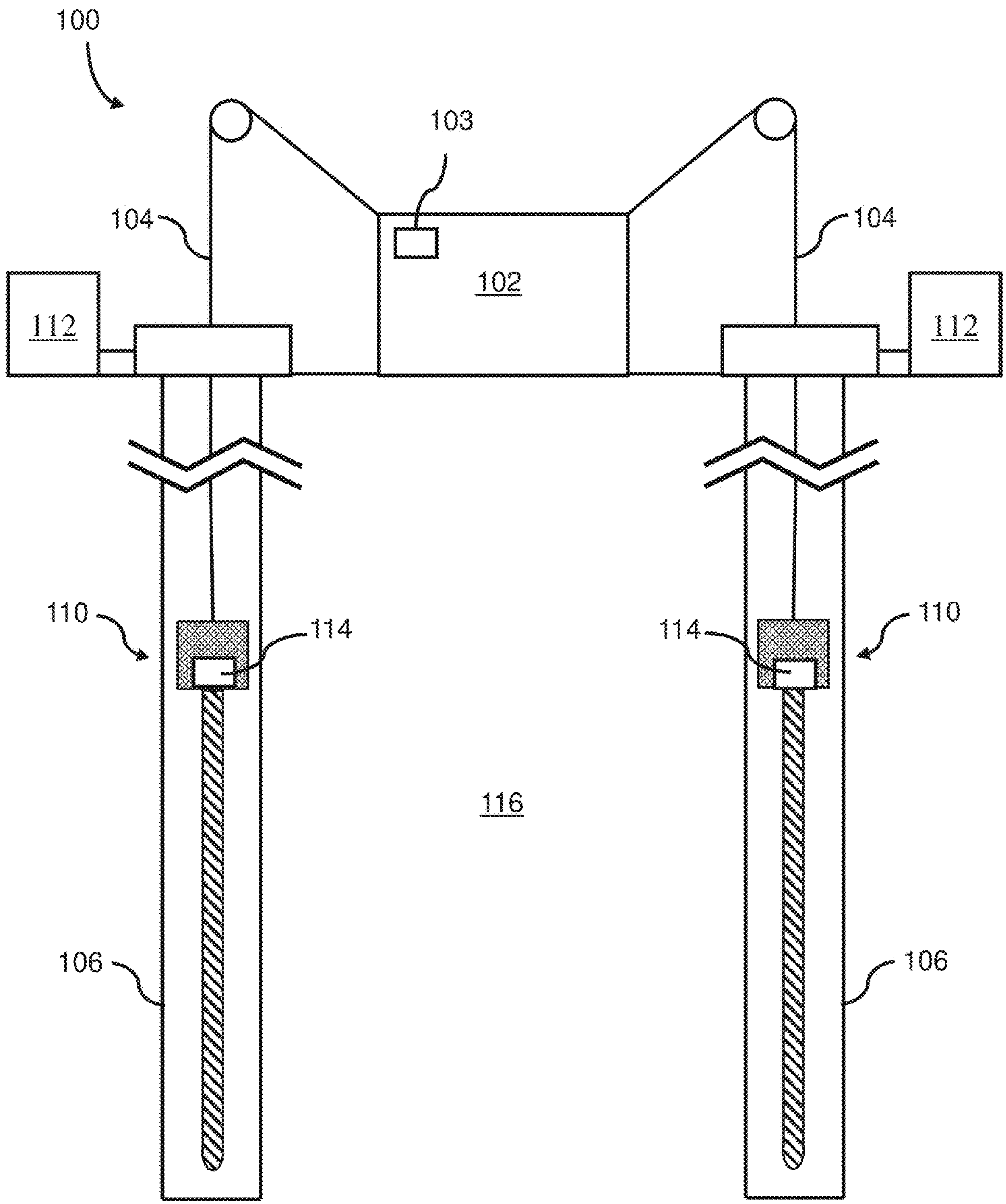
FIG. 1 schematically shows a system for hydraulic fracturing using electrical stimulation, according to some embodiments.

In view of the difficulty in obtaining geologic hydrogen from existing low permeability and, oftentimes, low-temperature formations, the Inventors have recognized the benefits associated with methods and systems for initiating and/or enhancing the production and extraction of geologic hydrogen using electrohydraulic fracturing and/or electrical stimulation of a hydrogen-producing geologic formation. Geologic hydrogen describes hydrogen produced within or held in rock formations, which are typically iron-rich rock formations (although the methods and systems described herein can extract hydrogen from other types of rock formations).

Electrohydraulic fracturing can be applied to a formation using direct-current (DC), alternating-current (AC), and/or pulsed power sources or devices, and may be combined with injection fluids (e.g., water) and additives (e.g., proppants, complexing agents, metals, catalysis, $CO_2$) to further enhance the production of geologic hydrogen. Electrical stimulation may create new fractures in geologic hydrogen reservoirs that can generate hydrogen upon exposure of the new fracture formations to water (e.g., via water-splitting reaction). Without wishing to be bound by theory, the enhanced hydrogen generation may be due to the electrohydraulic fracturing providing increased reactive surface areas within the rock formation to access more rock volume and enhance hydrogen production (e.g., via hydrogen-producing reactions) in response to either the presence of water in the formation and/or due to injection of water into the formation. Electrical stimulation may also be used in some embodiments to control the temperature of the rock formation, e.g., by heating the rock formation via Joule heating, where a current is passed through the reservoir and/or a fluid within the reservoir. The increased formation temperature facilitated by Joule heating may provide temperatures more suitable for geologic hydrogen production. Thus, as described in more detail below, electrical stimulation can increase the generation and recovery of geologic hydrogen as compared to the unstimulated formations before electrohydraulic fracturing.

While hydraulic fracturing has been used to extract other resources from geologic formations, such as natural gas and shale oil, the extraction of geologic hydrogen produced in geologic formations has been limited. This limitation is due to in-situ hydrogen production being constrained to impermeable geologic formations. The relative impermeability of these formations makes it difficult not only to drill into these formations but also for water to infiltrate and react to form hydrogen.

Many of these impermeable geologic formations contain high amounts of iron. Without wishing to be bound by any particular theory, one reaction in which elemental hydrogen (i.e., $H_2$) can be formed in iron-containing rock formations is shown below:

$$2FeO\ (s) + H_2O\ (l) \rightarrow H_2\ (g) + Fe_2O_3\ (s) \quad (1)$$

The subterranean environment may exclude molecular oxygen ($O_2$), facilitating the formation of $H_2$. Depending on the iron-bearing reactants (e.g., $Fe^{2+}$), the redox kinetics of oxidizing the iron species can operate at temperatures ranging from 0° to 400° C., and, in some cases, between 250° C. and 350° C., and pressure conditions of approximately 70 bar or other appropriate pressure (e.g., greater than or equal to 1 bar and/or less than or equal to 1 kbar). In some embodiments, this temperature of the reservoir may be artificially increased and/or maintained using Joule heating of a formation as elaborated on further below. In contrast, reservoirs stimulated by conventional hydraulic fracturing typically exhibit lower permeabilities and operate at much lower temperatures and/or pressures, and hence, the amounts of geologic hydrogen that can be extracted via conventional hydraulic fracturing is relatively low.

The Inventors have discovered and appreciated that hydrogen (e.g., $H_2$, hydrogen gas, dissolved hydrogen gas, compressed hydrogen gas) can be extracted from geologic rock formations (e.g., rock formations rich in iron) using electrohydraulic fracturing and/or electrical stimulation where conventional systems and methods for hydraulic fracturing are unsuitable for resource extraction (e.g., because of the low permeability/temperature of these geologic rock formations). As described by this disclosure, methods for generating and/or extracting geologic hydrogen are provided. These methods can be advantageous to extract geologic hydrogen from hard and/or low permeability rock formations that are inaccessible by conventional hydraulic fracturing techniques. In some embodiments, the methods may be particularly suitable for geologic rock formations that contain high amounts of iron. In some embodiments, the method includes heating and/or maintaining a temperature above average crustal temperatures (e.g., 14° C.) of the surrounding reservoir and/or fractures associated with the reservoir to temperatures that are favorable for the production of hydrogen, as in the instance of the generalized equation 1, above, where an iron species (e.g., $Fe^{2+}$) is oxidized, and water is concomitantly reduced to elemental hydrogen (i.e., $H_2$). Details regarding methods and systems for geologic hydrogen extraction are described below.

The Inventors have also appreciated that hydrogen can be produced using certain silicon-rich rock formations when hemolytic cleavage occurs during fracturing of rocks containing silicates forming Si radicals. Therefore, the Inventors have recognized that increased hydrogen production may be facilitated through the use of electrohydraulic fracturing. Specifically, electrohydraulic fracturing of a silicon rich formation may increase the reactive surface within the fractured formation with increased concentrations of Si radicals relative to the formation prior to electrohydraulic fracturing. This may correspondingly result in the production of hydrogen when water is introduced into the formation (e.g., via pumping and/or already present in the formation) that can be extracted from the formation both in existing reservoirs and/or in reservoirs where conventional systems and methods are unsuitable for resource extraction. Without wishing to be bound by any particular theory, one reaction in which elemental hydrogen (i.e., $H_2$) can be formed in silicon-containing rock formations is shown below:

$$SiO_2 \rightarrow Si\bullet + SiO\bullet. \quad \text{Equation 1}$$

$$Si\bullet + SiO\bullet \rightarrow SiO_2. \quad \text{Equation 2}$$

$$Si\bullet + O_{2(g)} \rightarrow SiOO\bullet. \quad \text{Equation 3}$$

$$Si\bullet + H_2O_{(l)} \rightarrow SiOH + H\bullet. \quad \text{Equation 4}$$

$$H\bullet + H\bullet \rightarrow H_{2(g)}. \quad \text{Equation 5}$$

$$H\bullet + O2_{(g)} \rightarrow HOO\bullet,. \quad \text{Equation 6}$$

where silyl radicals are shown as Si· and siloxyl radicals are shown as Si—O·

Of course, other silicon reactions may also generate hydrogen and is influenced by (at least) the acidity and/or alkalinity of the surrounding rock formation. Hydrogen-generating reactions involving silicon may occur at similar or different temperatures than those in which hydrogen is generated from iron, rather than silicon. In some cases, a rock formation comprising hydrogen-generating silicon is at, for example, a temperature between 0-150° C. as certain silicon-based reactions with water may be improved within this temperature range. Of course, other temperature ranges are possible (e.g., 0-500° C.). In some embodiments, this temperature of the reservoir may be increased and/or maintained using Joule heating of a formation as elaborated on further below. Of course, other temperatures are possible and are described elsewhere herein.

In some embodiments, it should be understood that hydrogen-generating reactions involving different mechanisms (e.g., iron and silicon) may occur in tandem, enhancing the generation of hydrogen from the formation. For example, a formation and/or tailings may include both reactive silicon and iron in the formation such that both of the above types of processes may occur. Thus, hydrogen generated due to silicon based and iron-based reactions with water may occur together in some embodiments. Without wishing to be bound by theory, in some instances Si radicals may be shorter lived as compared to iron-based reactants in a formation. Thus, hydrogen generated using silicon may be more pulse-like with a rapid initial increase in hydrogen generation prior to slowing down; whereas hydrogen generated from iron may exhibit a steadier generation rate over a longer duration. These hydrogen-generating mechanisms may occur in tandem in instances in which both silicon and iron-based compounds are present in a formation and/or tailings used to generate hydrogen.

In some embodiments, a subterranean formation that generates geologic hydrogen has relatively high amounts of iron. In some embodiments, an iron-rich rock formation includes iron at a weight percentage of between or equal to 1 wt % to 68 wt % (e.g., greater than or equal to 1 wt %, greater than or equal to 4 wt %, greater than or equal to 5 wt %, greater than or equal to 10 wt %, greater than or equal to 20 wt %, greater than or equal to 50 wt %, greater than or equal to 68 wt %, less than or equal to 50 wt %, less than or equal to 20 wt %, less than or equal to 10 wt %, less than or equal to 5 wt %, less than or equal to 4 wt %; combinations are possible). Non-limiting examples of iron-rich rock formations include minerals such as hematite, magnetite, greenalite, ankerite, siderite, pyrite, limonite, pyroxene, spinel, serpentine, pyroxene, cordierite and/or olivine. Other iron-rich rock formations are possible.

In some embodiments, a subterranean formation that generates geologic hydrogen has relatively high amounts of silicon (e.g., Si) or a silicon-containing compound (e.g., $SiO_2$). In some embodiments, an silicon-rich rock formation includes iron at a weight percentage of between or equal to 1 wt % to 50 wt % (e.g., greater than or equal to 1 wt %, greater than or equal to 4 wt %, greater than or equal to 5 wt %, greater than or equal to 10 wt %, greater than or equal to 20 wt %, greater than or equal to 50 wt %; less than or equal to 50 wt %, less than or equal to 20 wt %, less than or equal to 10 wt %, less than or equal to 5 wt %, less than or equal to 4 wt %; combinations are possible). Non-limiting examples of silicon-rich rock formations include felsic rocks, silicic rocks, mafic rocks, ultramafic rocks, porphyry deposits, both high and low sulfidation epithermal deposits, skarn deposits, orogenic gold deposits, quartzite, sandstone, metapelites, metabasites, rhyolite, dacite syenite, monzonite, and granite. Other silicon-rich rock formations are possible.

A subterranean formation may include combinations of any one or more of the above iron-rich formations and/or any other geologic hydrogen-generating rock formations that are capable of generating geologic hydrogen when exposed to water under the disclosed temperatures and pressures. In some embodiments, a subterranean formation is a peridotite, iron-rich, olivine-rich, mafic, ultramafic, skarn, iron-rich metasomatic rock, layered mafic intrusion, and/or massive sulfide (e.g., greater than or equal to 60 wt % sulfides) rock formation.

Some embodiments are particularly suited for extracting geologic hydrogen from relatively hard subterranean formations. For example, geological hydrogen may be extracted from subterranean formations by increasing their permeability. In some embodiments, the hardness of the subterranean formation (or rock tailings from a subterranean formation or some other source) is between or equal to 2 on the Mohs scale and 8 on the Mohs scale (e.g., greater than or equal to 2, greater than or equal to 4, greater than or equal to 6, greater than or equal to 8; less than or equal to 8, less than or equal to 6, less than or equal to 4; combinations are possible).

Geologic hydrogen can be extracted from subterranean formations with relatively low permeability. In some embodiments, a permeability of a subterranean formation prior to electrohydraulic fracturing may be less than or equal to $10^{-20}$ $m^2$. In some embodiments, the permeability of a subterranean formation may exhibit an increase in permeability of at least 2, 10, 100 or other appropriate multiple increase in permeability after electrohydraulic fracturing. In some instances, the increase in permeability may be less than 1000, 100, or other appropriate multiple of the original permeability of the formation. For example, a formation may exhibit an increase in permeability between or equal to 2 and 1000 times the original permeability, though other potential increases are possible. In some embodiments, the permeability of a formation capable of generating hydrogen after electrohydraulic fracturing may be between or equal to $10^{-18}$ $m^2$ and $10^{-7}$ $m^2$ (e.g., greater than or equal to $10^{-18}$ $m^2$, greater than or equal to $10^{-17}$ $m^2$, greater than or equal to $10^{-16}$ $m^2$, greater than or equal to $10^{-15}$ $m^2$, greater than or equal to $10^{-14}$ $m^2$, greater than or equal to $10^{-13}$ $m^2$, greater than or equal to $10^{-12}$, greater than or equal to $10^{-11}$ $m^2$, greater than or equal to $10^{-10}$ $m^2$, greater than or equal to $10^{-9}$ $m^2$, greater than or equal to $10^{-8}$ $m^2$, greater than or equal to $10^{-7}$ $m^2$; less than or equal to $10^{-7}$ $m^2$, less than or equal to $10^{-8}$ $m^2$, less than or equal to $10^{-9}$ $m^2$, less than or equal to $10^{-10}$ $m^2$, less than or equal to $10^{-11}$ $m^2$, less than or equal to $10^{-12}$ $m^2$, less than or equal to $10^{-13}$ $m^2$, less than or equal to $10^{-14}$ $m^2$, less than or equal to $10^{-15}$ $m^2$, less than or equal to $10^{-16}$ $m^2$, less than or equal to $10^{-17}$ $m^2$, less than or equal to $10^{-18}$ $m^2$; combinations are possible).

To measure a permeability of a rock formation (e.g., a subterranean formation, a reservoir), for example, either before or after electrically fracturing, single and cross-well pumping tests may be performed to determine the initial and/or final permeabilities of the rock formation. This includes the injection of water, or other appropriate fluid, in one or more wells, and a measurement of hydraulic pressure responses in the one or more wells.

As mentioned above, in some embodiments, a fluid is injected into the subterranean formation. The fluid may act as a transport fluid to carry additives (e.g., proppants, complexing agents, surfactants, metals and/or catalysts) to the subterranean formation. In some embodiments, the fluid comprises water. In some embodiments, the fluid comprises carbon dioxide (e.g., compressed carbon dioxide, supercritical carbon dioxide). In some embodiments, the fluid comprises a combination of carbon dioxide and water. However, the fluid may comprise other species.

As noted above, in some embodiments, the fluid injected into the subterranean formation comprises carbon dioxide or water suspended and/or dissolved in carbon dioxide. In some such embodiments, this is advantageous because carbon dioxide can be sequestered into the subterranean formation while geologic hydrogen is extracted, which may result in a carbon-neutral or carbon-negative process in some embodiments.

To facilitate electrohydraulic fracturing and/or heating of a subterranean formation, a fluid injected into a well (e.g., the hydraulic fracturing fluid) may have a particular conductivity. In some embodiments, the conductivity of the fluid is greater than or equal to 100 μS/cm, greater than or equal to 200 μS/cm, greater than or equal to 500 μS/cm, greater than or equal to 1,000 μS/cm, greater than or equal to 5,000 μS/cm, greater than or equal to 10,000 μS/cm, greater than or equal to 50,000 μS/cm, or greater than or equal to 100,000 μS/cm. In some embodiments, the conductivity of the fluid is less than or equal to 100,000 μS/cm, less than or equal to 50,000 μS/cm, less than or equal to 10,000 μS/cm, less than or equal to 5,000 μS/cm, less than or equal to 1,000 μS/cm, less than or equal to 500 μS/cm, less than or equal to 200 μS/cm, or less than or equal to 100 μS/cm. Combinations of the foregoing ranges are also possible (e.g., greater than or equal to 100 μS/cm and less than or equal to 100,000 μS/cm). Other ranges are possible as this disclosure is not so limited.

As described above and elsewhere herein, various embodiments include electrically fracturing a rock formation (e.g., a subterranean formation) to facilitate the extraction of geologic hydrogen. In some embodiments, electricity is provided to the rock formation via direct current (e.g., a DC or an AC current from a power source). In some embodiments, the direct or alternating current has a voltage of greater than or equal to 50 V, greater than or equal to 100 V, greater than or equal to 500 V, greater than or equal to 1 kV, greater than or equal to 5 kV, greater than or equal to 10 kV, greater than or equal to 50 kV, or greater than or equal to 100 kV. In some embodiments, the direct or alternating current has a voltage of less than or equal to 100 kV, less than or equal to 50 kV, less than or equal to 10 kV, less than or equal to 5 kV, less than or equal to 1 kV, less than or equal to 500 V, less than or equal to 100 V, or less than or equal to 50 V. Combinations of the foregoing ranges are also possible (e.g., greater than or equal to 50 V and less than or equal to 100 kV). In another embodiment, the voltage may be between or equal to 1 kV and 100 kV. Other ranges are possible as this disclosure is not so limited.

In some embodiments, a DC or an AC power device provides an electric current to the rock formation (e.g., via two or more electrodes) with a particular amount of power. In some embodiments, the electric current has a power of greater than or equal to 1 MW, greater than or equal to 5 MW, greater than or equal to 10 MW, greater than or equal to 50 MW, greater than or equal to 100 MW, greater than or equal to 500 MW, or greater than or equal to 1,000 MW. In some embodiments, the electric current has a power of less than or equal to 1,000 MW, less than or equal to 500 MW, less than or equal to 100 MW, less than or equal to 50 MW, less than or equal to 10 MW, less than or equal to 5 MW, or less than or equal to 1 MW. Combinations of the above-referenced ranges are also possible (e.g., greater than or equal to 1 MW and less than or equal to 1,000 MW). Of course, other ranges are possible as this disclosure is not so limited.

In some embodiments, an electric pulse can be administered via a pulsed power device with a particular voltage. In some embodiments, the electric pulse has a peak voltage of greater than or equal to 50 V, greater than or equal to 100 V, greater than or equal to 500 V, greater than or equal to 1 kV, greater than or equal to 5 kV, greater than or equal to 10 kV, greater than or equal to 50 kV, greater than or equal to 100 kV, greater than or equal to 300 kV, greater than or equal to 500 kV, greater than or equal to 700 kV, or greater than or equal to 800 kV. In some embodiments, the electric pulse has a peak voltage of less than or equal to 800 kV, less than or equal to 700 kV, less than or equal to 500 kV, less than or equal to 300 kV, less than or equal to 100 kV, less than or equal to 50 kV, less than or equal to 10 kV, less than or equal to 5 kV, less than or equal to 1 kV, less than or equal to 500 V, less than or equal to 100 V, or less than or equal to 50 V. Combinations of the foregoing ranges are also possible (e.g., greater than or equal to 50 V and less than or equal to 100 kV). In another embodiment, the peak voltage may be between or equal to 1 kV and 100 kV. Other ranges are possible as this disclosure is not so limited.

In some embodiments, a pulse power device administers an electric pulse with a particular amount of energy. In some embodiments, an electric pulse is delivered with greater than or equal to 1 kJ/pulse, greater than or equal to 5 kJ/pulse, greater than or equal to 10 kJ/pulse, greater than or equal to 25 kJ/pulse, greater than or equal to 50 kJ/pulse, greater than or equal to 75 kJ/pulse, or greater than or equal to 100 kJ/pulse. In some embodiments, an electric pulse is delivered with less than or equal to 100 kJ/pulse, less than or equal to 75 kJ/pulse, less than or equal to 50 kJ/pulse, less than or equal to 25 kJ/pulse, less than or equal to 10 kJ/pulse, less than or equal to 5 kJ/pulse, or less than or equal to 1 kJ/pulse. Combinations of the foregoing ranges are also possible (e.g., greater than or equal to 1 kJ/pulse and less than or equal to 100 kJ/pulse). Other ranges are possible as this disclosure is not so limited.

In some embodiments, a pulse power device administers an electric pulse with a particular amount of power. In some embodiments, the electric pulse has a peak power of greater than or equal to 1 MW, greater than or equal to 5 MW, greater than or equal to 10 MW, greater than or equal to 50 MW, greater than or equal to 100 MW, greater than or equal to 500 MW, or greater than or equal to 1,000 MW. In some embodiments, the electric pulse has a peak power of less than or equal to 1,000 MW, less than or equal to 500 MW, less than or equal to 100 MW, less than or equal to 50 MW, less than or equal to 10 MW, less than or equal to 5 MW, or less than or equal to 1 MW. Combinations of the above-referenced ranges are also possible (e.g., greater than or equal to 1 MW and less than or equal to 1,000 MW). Of course, other ranges are possible as this disclosure is not so limited.

It should be appreciated that a power source may be configured to generate (and/or a high voltage cable may be configured to accommodate) electricity of any suitable current, as the disclosure is not limited in this regard. In some embodiments, the power source may be configured to generate a peak current of greater than or equal to 10 amperes (A), 20 A, 50 A, 100 A, 250 A, 500 A, 1 kA, or 10 kA. In some embodiments, the power source may be configured to generate a peak current of less than or equal to 10 kA, 1 kA, 500 A, 250 A, 100 A, 50 A, or 20 A. Typical operating ranges may include currents in the range of 10-80 A. However, current ranges both greater than and less than those noted above are also contemplated.

One or more electrodes (e.g., two electrodes) may be used to electrically stimulate a fracture. The one or more electrodes are operatively associated with one or more power sources to provide power, as described above. In some embodiments, the one or more electrodes are configured to apply a voltage potential between or adjacent to a first portion of the reservoir and a second portion of the reservoir.

In some such embodiments, the applied voltage potential heats the reservoir (e.g., via Joule heating) due to the flow of current between the electrodes and through the formation and/or a liquid within the formation. Non-limiting examples of appropriate electrodes may include titanium, aluminum, copper, and alloys and/or compounds thereof. In one embodiment, an electrode may comprise cobalt beryllium copper.

In some embodiments, a fluid comprises additives, such as proppants, to facilitate fracturing. Non-limiting examples of proppants include alumina ($Al_2O_3$), silica ($SiO_2$), and/or polymers, such as copolymers (e.g., resin $C_{21}H_{25}ClO_5$). In some embodiments, the fluid comprises a conductive proppant. Non-limiting examples of conductive proppant include ceramic particles (e.g., electrically conductive ceramic particles), coated particles (e.g., particles coated with a conductive material such as a conductive metal or other conductive material, conductive composite particles where the composite particles include a non-conductive and conductive material), copolymers and resin, carbon particles (e.g., carbon black, acetylene black, petroleum coke, graphite), and metal particles (e.g., stainless steel shot). Additional non-limiting examples of conductive proppants include porous or sintered metals, such as aluminum or aluminum alloys. Combinations of these additives are also possible (e.g., petroleum coke and another proppant).

An additive of the fluid (e.g., a proppant) may have a particular size or dimension. In some embodiments, an average maximum transverse dimension of an additive is greater than or equal to 100 μm, greater than or equal to 200 μm, greater than or equal to 300 μm, greater than or equal to 400 μm, greater than or equal to 500 μm, greater than or equal to 600 μm, greater than or equal to 700 μm, greater than or equal to 800 μm, greater than or equal to 900 μm, greater than or equal to 1,000 μm, greater than or equal to 2 mm, or greater than or equal to 3 mm. In some embodiments, an average maximum transverse dimension of an additive is less than or equal to 3 mm, less than or equal to 2 mm, less than or equal to 1,000 μm, less than or equal to 900 μm, less than or equal to 800 μm, less than or equal to 700 μm, less than or equal to 600 μm, less than or equal to 500 μm, less than or equal to 400 μm, less than or equal to 300 μm, less than or equal to 200 μm, or less than or equal to 100 μm. Combinations of the foregoing ranges are also possible (e.g., greater than or equal to 100 μm and less than or equal to 3 mm). Other ranges are possible.

In some embodiments, an additive, such as a proppant, within the fluid may include a plurality of porous particles with a particular average porosity. In some embodiments, the average porosity of the additive particles is greater than or equal to 10%, greater than or equal to 15%, greater than or equal to 20%, greater than or equal to 25%, greater than or equal to 30%, greater than or equal to 40%, greater than or equal to 50%, greater than or equal to 60%, or greater than or equal to 70%. In some embodiments, the average porosity of the additive particles is of less than or equal to 70%, less than or equal to 60%, less than or equal to 50%, less than or equal to 40%, less than or equal to 30%, less than or equal to 25%, less than or equal to 20%, less than or equal to 15%, or less than or equal to 10%. Combinations of the foregoing ranges are also possible (e.g., greater than or equal to 10% and less than or equal to 70%). Other ranges are possible.

In some embodiments, an additive (e.g., a proppant) of the fluid has a particular average pore size. In some embodiments, the additive has an average pore diameter of greater than or equal to 50 nm, greater than or equal to 100 nm, greater than or equal to 200 nm, greater than or equal to 250 nm, greater than or equal to 500 nm, greater than or equal to 750 nm, greater than or equal to 1 μm, greater than or equal to 5 μm, greater than or equal to 10 μm, greater than or equal to 20 μm, greater than or equal to 25 μm, greater than or equal to 50 μm, greater than or equal to 100 μm, greater than or equal to 250 μm, greater than or equal to 500 μm, greater than or equal to 750 μm, or greater than or equal to 1,000 μm. In some embodiment, the additive has an average pore diameter of less than or equal to 1,000 μm, less than or equal to 750 μm, less than or equal to 500 μm, less than or equal to 250 μm, less than or equal to 100 μm, less than or equal to 50 μm, less than or equal to 25 μm, less than or equal to 20 μm, less than or equal to 10 μm, less than or equal to 5 μm, less than or equal to 1 μm, less than or equal to 750 nm, less than or equal to 500 nm, less than or equal to 250 nm, less than or equal to 100 nm, or less than or equal to 50 nm. Combinations of the foregoing ranges are also possible (e.g., greater than or equal to 50 nm and less than or equal to 1,000 μm). Other ranges are possible as this disclosure is not so limited.

In some embodiments, an additive (e.g., a proppant) is present within the fluid at a particular amount. In some embodiments, a weight percentage of additive within the fluid is greater than or equal to 1%, greater than or equal to 2%, greater than or equal to 3%, greater than or equal to 5%, greater than or equal to 10%, greater than or equal to 15%, greater than or equal to 20%, greater than or equal to 25%, greater than or equal to 30%, greater than or equal to 40%, greater than or equal to 50%, or greater than or equal to 60%. In some embodiments, a weight percentage of additive within the fluid is less than or equal to 60%, less than or equal to 50%, less than or equal to 40%, less than or equal to 30%, less than or equal to 25%, less than or equal to 20%, less than or equal to 15%, less than or equal to 10%, less than or equal to 5%, less than or equal to 3%, less than or equal to 2%, or less than or equal to 1%. Combinations of the foregoing ranges also possible (e.g., greater than or equal to 1% and less than or equal to 60%). Of course, other ranges are possible as this disclosure is not so limited.

As noted above, methods and systems described herein may provide heat and/or maintain a temperature to a reservoir (or one or more fractures in fluid communication with the reservoir). In some embodiments, electrically stimulating a reservoir (or one or more fractures in fluid communication with the reservoir) comprises heating at least a portion of the reservoir by greater than or equal to 1° C., greater than or equal to 2° C., greater than or equal to 5° C., greater than or equal to 10° C., greater than or equal to 50° C., greater than or equal to 100° C., greater than or equal to 200° C., greater than or equal to 300° C., greater than or equal to 400° C., or other appropriate temperature relative to a temperature of the reservoir prior to electrically heating the reservoir. The temperature of the formation may also be heated by less than or equal to 400° C., 300° C., 200° C., or other appropriate temperature. In some embodiments, electrically stimulating the reservoir comprises heating at least a portion of the reservoir to between 25° C. and 270° C., between 38° C. and 100° C., or between 67° C. and 84° C. Combinations of the above are contemplated including heating a temperature of a formation by between 100° C. and 400° C. relative to an equilibrium temperature of the formation. Other temperatures relative to a temperature of the reservoir prior to injecting the fluid are also possible.

The temperature (e.g., average temperature) of the reservoir may be provided and/or maintained to facilitate hydrogen-forming reactions (e.g., increasing the rate of hydrogen gas generation from Si and/or Fe reactions) either within a formation and/or within tailings. For example, in some embodiment, the temperature is between or equal to 0° C. and 500° C. In some such embodiments, the temperature is between or equal to 250° C. and 350° C. In some such embodiments, the temperature is between or equal to 25° C. and 270° C. In some embodiments, a temperature (e.g., an average temperature) of a reservoir is maintained to be greater than or equal to 25° C., greater than or equal to 38° C., greater than or equal to 50° C., greater than or equal to 67° C., greater than or equal to 75° C., greater than or equal to 84° C., greater than or equal to 100° C., greater than or equal to 125° C., greater than or equal to 150° C., greater than or equal to 175° C., greater than or equal to 200° C., greater than or equal to 225° C., greater than or equal to 250° C., greater than or equal to 270° C., greater than or equal to 300° C., greater than or equal to 325° C., greater than or equal to 350° C., greater than or equal to 370° C., greater than or equal to 400° C., greater than or equal to 425° C., greater than or equal to 450° C., greater than or equal to 470° C., or other appropriate temperature. In some embodiments, a temperature of a reservoir is maintained to be less than or equal to 500° C., less than or equal to 470° C., less than or equal to 450° C., less than or equal to 425° C., less than or equal to 400° C., less than or equal to 370° C., less than or equal to 350° C., less than or equal to 325° C., less than or equal to 300° C., less than or equal to 270° C., less than or equal to 250° C., less than or equal to 225° C., less than or equal to 200° C., less than or equal to 175° C., less than or equal to 150° C., less than or equal to 125° C., less than or equal to 100° C., less than or equal to 84° C., less than or equal to 75° C., less than or equal to 67° C., less than or equal to 50° C., or less than or equal to 25° C. Combinations of the foregoing range are also contemplated (e.g., maintaining a temperature of the reservoir greater than or equal to 250° C. and less than or equal to 500° C., or more preferably between or equal to about 250° C. and 400° C.). In another embodiment, the temperature of the reservoir may be maintained between or equal to 10° C. and 100° C. or more preferably between or equal to 50° C. and 100° C. Of course, other ranges are possible as this disclosure is not so limited. Advantageously, the temperature of the reservoir may be maintained to promote the generation of geologic hydrogen (e.g., $H_2$). In some embodiments, the above temperature ranges, and/or other temperature ranges discussed herein with regards to specific types of formations and/or reactions, may be referred to as a hydrogen production temperature for use with a subterranean formation and/or tailings.

In some embodiments, the temperature of the reservoir can be adjusted to promote the reaction of water with iron (e.g., reduced iron) and/or silicon (e.g., silicon radicals, siloxy radicals).

Electrically fracturing and/or Joule heating may increase the generation rate of hydrogen. In some embodiments, a rate of hydrogen generation (e.g., from a reaction of water with iron, from a reaction of water with silicon radicals) is greater than 0.0001 nanomoles $H_2$/gram rock and less than or equal to 10,000 nanomoles $H_2$/gram rock (e.g., greater than or equal to 0.0001 nanomoles $H_2$/gram rock, greater than or equal to 0.01 nanomoles $H_2$/gram rock, greater than or equal to 1 nanomoles $H_2$/gram rock, greater than or equal to 100 nanomoles $H_2$/gram rock, greater than or equal to 10,000 nanomoles $H_2$/gram rock; less than or equal to 10,000 nanomoles $H_2$/gram rock, less than or equal to 100 nanomoles $H_2$/gram rock, less than or equal to 1 nanomoles $H_2$/gram rock, less than or equal to 0.01 nanomoles $H_2$/gram rock, less than or equal to 0.0001 nanomoles $H_2$/gram rock; combinations of these ranges are possible). Other ranges are possible as this disclosure is not so limited.

As noted in relation to the figures, a well may be drilled into a subterranean formation to facilitate the extraction of geologic hydrogen. A well refers to a borehole extending into a geological feature (e.g., a subterranean formation). For example, a borehole may extend through one or more strata disposed between an upper ground surface of a formation and a below ground reservoir that the borehole is used to access. This may include applications such as, petroleum producing reservoirs (e.g., oil and gas producing reservoirs), water reservoirs, geothermal reservoirs including Enhanced Geothermal Systems (EGS), carbon sequestration reservoirs, in situ mineral mining reservoir, and/or any other appropriate geological feature that a borehole may be formed in. The borehole may further comprise features to maintain the structural integrity of the well (e.g., well hole casings).

The reservoir and/or surrounding well environment may be under relatively high pressures. In some cases, a well environment may be associated with a pressure of greater than or equal to 5 megapascals (MPa), 10 MPa, 25 MPa, 50 MPa, 100 MPa, or other appropriate pressure. In some cases, a well environment may be associated with a pressure of less than or equal to 150 MPa, 100 MPa, 50 MPa, 25 MPa, 10 MPa, or other appropriate pressure. Combinations of the above are contemplated including, for example, a pressure between about 5 MPa and 150 MPa. However, pressure ranges both greater than and less than those noted above are also contemplated.

As used herein a subterranean formation, rock formation, formation, reservoir, or other similar term may refer to a geologic formation that has a composition that is capable of producing hydrogen when exposed to water under appropriate temperature and/or pressure conditions. For example, in some embodiments, water maybe injected into the formation to produce hydrogen within the formation that may then be extracted as elaborated on further below. This hydrogen produced by the formation may also be referred to as geologic hydrogen in some embodiments.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 schematically depicts an embodiment of a system that may be used to electrohydraulically fracture and/or stimulate a subterranean formation 116. Of course, it should be understood that an overall system used to implement any of the methods disclosed herein may be implemented using two or more electrodes which may either correspond to the system depicted in FIG. 1 and/or may correspond to any appropriate type of electrodes as the disclosure is not limited in this fashion. In either case, the depicted system 100 includes a surface power source 102 coupled to two or more downhole tools 110, which are depicted as electrodes disposed on a distal end portion of the cable or drill string, disposed within separate wells 106. The power source 102 is connected to the two downhole tools 110 by separate high voltage cables 104, or other electrical conductors, that are configured to transmit power (e.g., direct current, alternating current, pulsed power) from the power source to the downhole tools to perform the noted electrohydraulic fracturing and/or Joule heating of a subterranean formation, and in instances in some instances tailings. During operation, the power source 102 may be electrically connected to the depicted two or more electrodes disposed in two or more wells, or any other appropriate number of electrodes and wells, to permit the passage of current between the two electrodes through a formation as elaborated on further below. Additionally or alternatively, and as noted above, the depicted system may also be used provide and/or maintain the subterranean formation within a predetermined temperature range greater than or equal to 0° C. (e.g., 250° C.), which can facilitate the formation and/or extraction of hydrogen from a well drilled into the subterranean formation. This well used to extract hydrogen may either be a separate well, or it may one or more of the depicted wells including electrodes disposed therein. To facilitate the injection of fracturing fluids, such as a conductive fracturing fluid and/or proppant, and/or the injection of water into the formation, the system may include one or more pumps 112 configured to pump a desired liquid, such as the noted fracturing fluid, proppant, carbon dioxide, and/or water, into the wells and correspondingly into the formation 116.

In some embodiments, the system 100 also includes at least one processor 103 with associated non-transitory computer readable memory. In some embodiments, the system 100 may also include one or more sensors, such as the sensors 114 disposed down hole on the downhole tools 110, configured to sense one or more parameters (e.g., temperature, gas composition, pressure, or other appropriate parameter) related to the formation 116. The one or more sensors may be configured to transmit signals related to the one or more sensed parameters, such as temperature from a temperature sensor in some embodiments, to the one or more processors for performing any of the methods disclosed herein. The non-transitory computer readable memory may include processor executable instructions that when executed cause the at least one processor 103 to control the system 100 shown in FIG. 1 to perform any of the methods described herein or other suitable methods for generating and/or extracting geologic hydrogen. For example, the processor 103 may be configured to control the power transmitted to the downhole tool 100. Other functions of the at least one processor are also possible.

While the above embodiment is primarily described relative to a subterranean formation, such a system may also be implemented to generate hydrogen with tailings as previously noted. Also, the implementation of such a system with the electrodes, pump, and other structures associated with a reactor containing the desired hydrogen generating materials are also contemplated as also described herein. Thus, the depicted system should not be interpreted as only being used with subterranean formations.

Figure 2A:
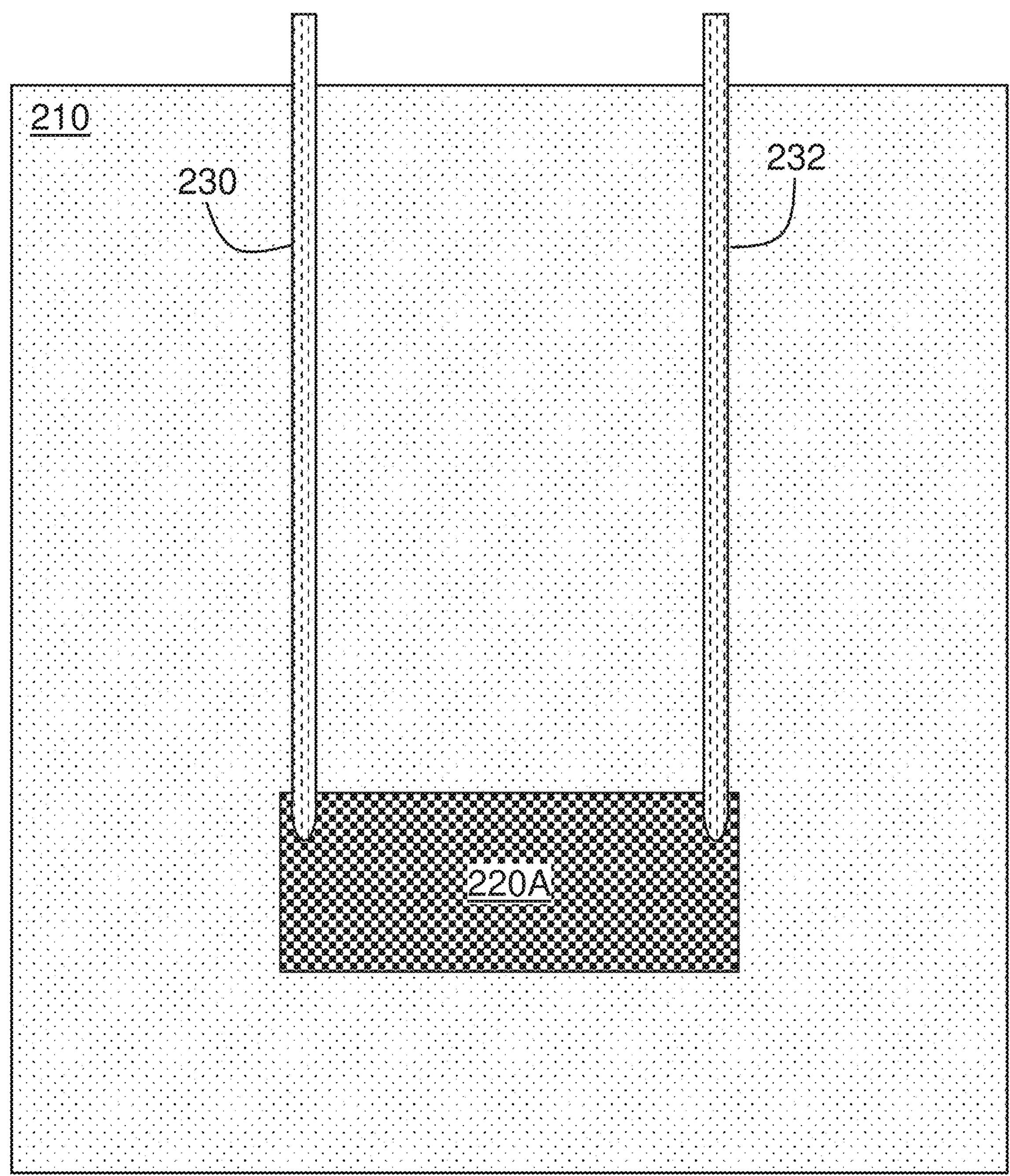
FIGS. 2A-2B schematically depict electrically stimulating a reservoir, according to some embodiments.
Figure 2B:
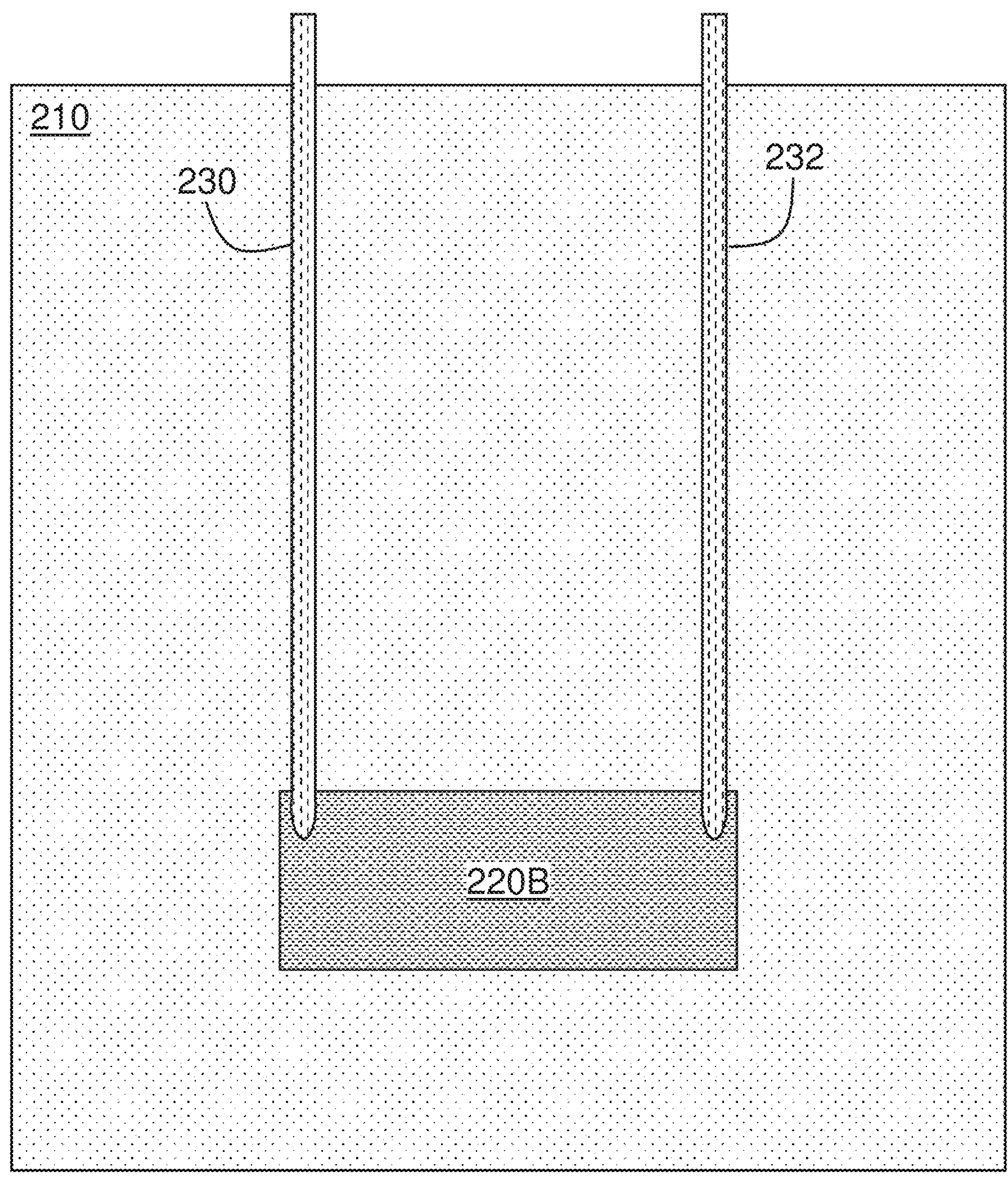

As mentioned above and elsewhere herein, the methods and systems described by this disclosure may be used to perform electrohydraulic fracturing of a subterranean formation. The methods and systems may also be used to optionally provide heat and/or maintain a temperature of a reservoir. By way of illustration and not limitation, FIG. 2A schematically illustrates two or more electrodes in electrical contact with a reservoir within a subterranean formation. In the figure, the subterranean formation 210 contains a reservoir 220A, and a first electrode 230 and second electrode 232 disposed in two wells extending into the reservoir to place the conductive distal end portions of the electrodes in electrical communication with the reservoir 220A. Power can be provided to first electrode 230 and second electrode 232 (e.g., a potential is created across the first electrode 230 and the second electrode 232) such that that a current passes between the electrodes through the reservoir 220A such the reservoir is heated (e.g., Joule heated). As shown in FIG. 2B, power can be provided to first electrode 230 and/or second electrode 232 to cause increased fracturing of the reservoir as shown by reservoir 220B. In some embodiments, lower powers may be applied to simply heat the reservoir to a desired temperature. Similar to FIG. 1, the electrodes may be coupled to one or more power sources and/or processors to provide feedback control using one or more associated sensors (e.g., temperature, gas composition, pressure, or other appropriate sensors) so that an appropriate amount of power, current, voltage, or other operating parameter is provided during operation.

Figure 2C:
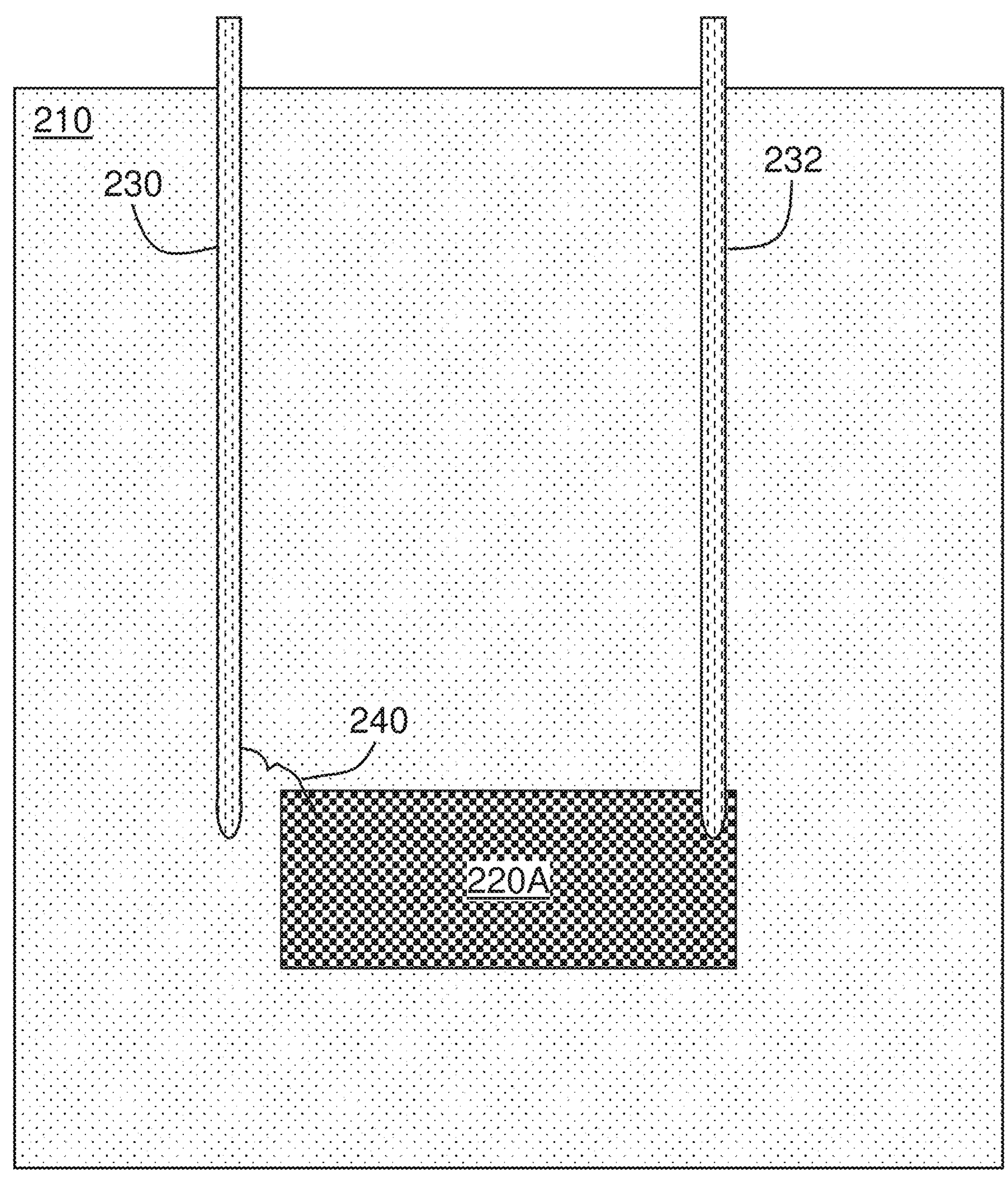
FIGS. 2C-2D schematically depict electrical stimulation of a fracture in fluid communication with a reservoir, according to some embodiments.
Figure 2D:
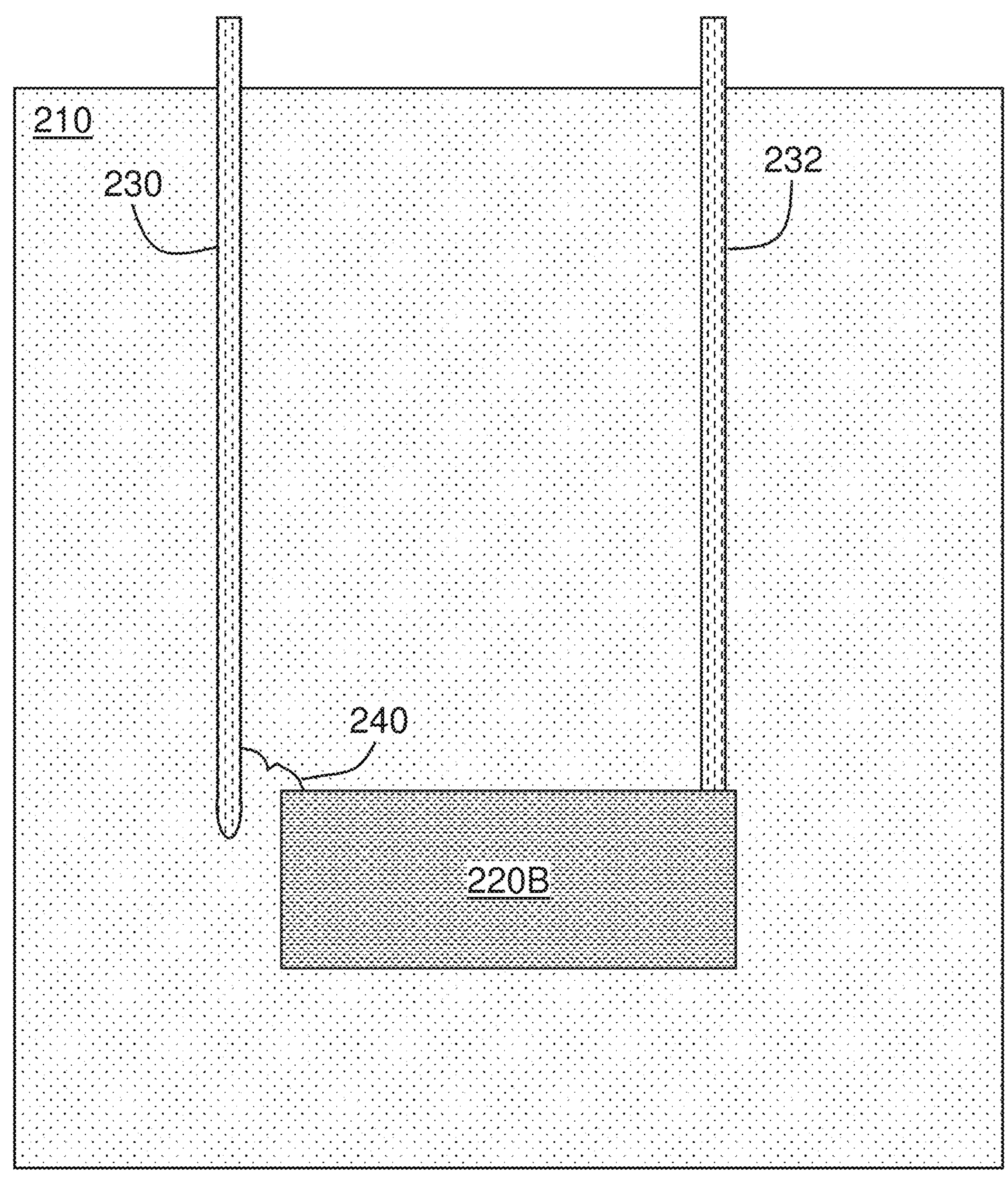

It should be understood that the electrodes need not be in direct contact with the reservoir. For example, the one or more electrodes may be in contact with a fracture in fluid communication with the reservoir, and the electrode(s) may provide energy to the fracture (e.g., a fluid within the fracture and in fluidic communication with the reservoir). Thus, electrohydraulic fracturing and/or heating of the reservoir may be conducted even without direct contact with a portion of a subterranean formation including a composition appropriate for forming geologic hydrogen. As shown in FIG. 2C, the first electrode 230 is in contact with a fracture 240, which is in fluidic communication with the reservoir 220A. Power can be applied the first and second electrodes 230 and 232 to provide either electrohydraulic fracturing or controlled heating of the reservoir 220B as schematically shown in FIG. 2D.

Figure 3:
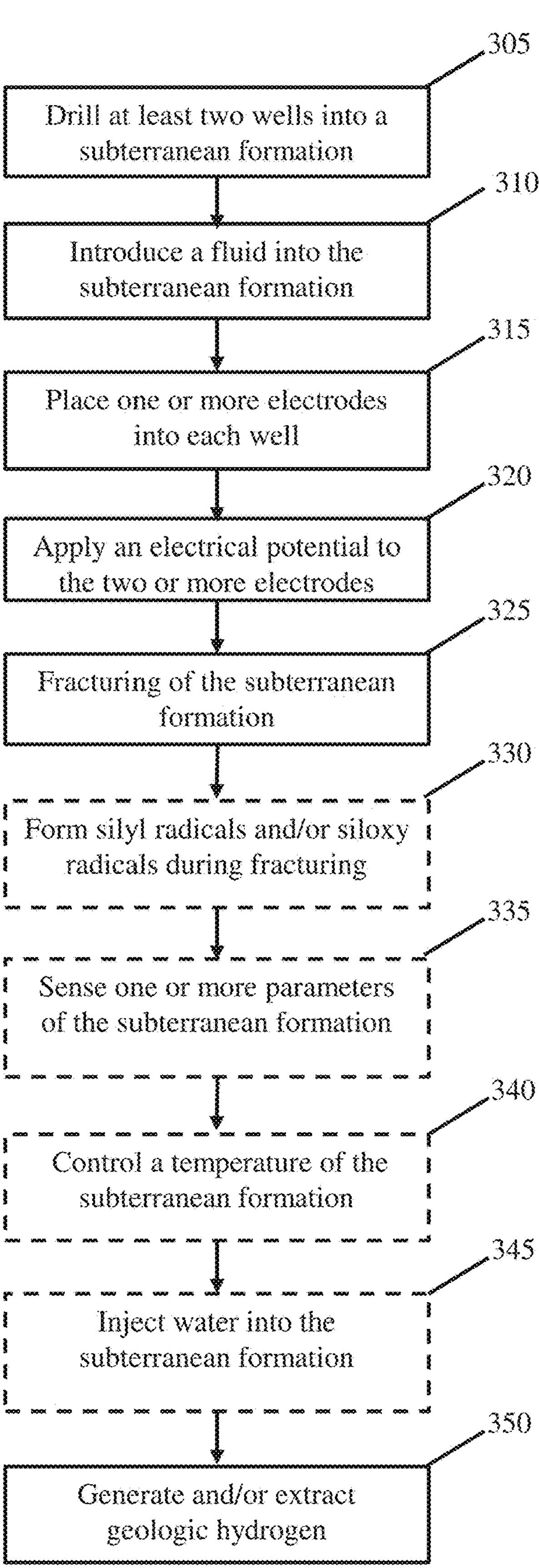
FIG. 3 is a flow chart depicting a process for generating and extracting geologic hydrogen, according to some embodiments.

FIG. 3 presents a schematic flow diagram illustrating a process for generating geologic hydrogen within a subterranean formation, and in some instances, extracting the geologic hydrogen. At least two wells are drilled into a subterranean rock formation (305) which may produce hydrogen when water is exposed to the formation at appropriate temperatures and/or pressures (e.g., a geologic hydrogen producing formation). Fluid may be introduced into the subterranean formation through one or more of the wells at (310). This fluid may be a hydraulic fracturing fluid including appropriate additives and/or proppants in some embodiments. Further, in some embodiments, the fluid may include liquid water. One or more electrodes may be placed into each of the wells (315), and an electrical potential is applied between the electrodes (320) causing a current to pass between the electrodes through the fluid and/or subterranean formation itself. Thus, the applied electrical potential may cause Joule heating of the fluid and/or the surrounding subterranean formation which may result in fracturing of the formation (325). Specifically, rapid temperature changes (upon heating and/or cooling of the formation), formation of a shockwave, and/or expansion of the fluid and/or formation during the electrohydraulic fracturing process may lead to increased fracturing of the subterranean formation. Depending on the type of subterranean formation, in some embodiments, silicon radicals and/or siloxy radicals may be formed during the fracturing process as detailed further above (330).

As previously noted, in some such embodiments, it may be desirable to control a temperature of the subterranean formation. In such an embodiment, a temperature or other parameter related to the formation of geologic hydrogen from the subterranean formation may be sensed by one or more sensors positioned downhole within a well (e.g., within a formation capable of generating geologic hydrogen). The one or more sensors may either be separate from or connected to the downhole electrodes used to apply electrical potentials to the subterranean formation. In either case, the one or more sensors may sense one or more parameters (335). Appropriate parameters may include, but are not limited to temperature, pressure, gas composition, and/or other appropriate parameters. The operation of the two or more electrodes may then be controlled based on the sensed one or more parameters. For example, in instances where it is desirable to control a temperature of the subterranean formation, the current, electrical potential, power, or other operating parameter applied by the two or more electrodes may be controlled to maintain a temperature of the subterranean formation to be within a predetermined range of temperatures (340). Two (or more) electrodes can be used to continuously dissipate electric energy as heat (i.e., via Joule heating) through the rock formations and/or fluid within the pores of the rock formation. In some such embodiments, both DC and AC (or a combined DC/AC) stimulation may be used. The electric current can heat the reservoir with power proportional to both voltage and current.

After electrohydraulic fracturing and optional temperature control of the formation, water may be injected into the subterranean formation at 345 using one or more pumps as previously described. This may result in a reaction between the water and one or more appropriate materials in the subterranean formation as elaborated on above such that geologic hydrogen may be generated and/or extracted from the subterranean formation (340). For example, and without wishing to be bound by theory, the hydrogen may be generated via reaction with one or more compositions such as iron (e.g., iron radicals), silicon (e.g., silicon radicals and/or siloxy radicals), and/or any other appropriate water reactive composition capable of reacting with water to form hydrogen that is present in the subterranean formation. The resulting generated hydrogen may either be dissolved in the water and/or gaseous hydrogen may be produced in the formation. Accordingly, extraction of hydrogen from the formation may include extraction of pressurized gas from one or more wells, the pumping of fluid out of one or more wells with hydrogen gas dissolved therein, and/or using any other appropriate extraction method for extracting geologic hydrogen from within the subterranean formation. In some instances, extracting the geologic hydrogen may include injecting a fluid, such as water and/or carbon dioxide into the subterranean formation to either enhance the generation of hydrogen and/or the extraction of generated hydrogen from the subterranean formation.

As described above, embodiments include generating and/or extracting geologic hydrogen from rock formations (e.g., subterranean rock formations). The hydrogen can be in a variety of forms. For example, in some embodiments, the hydrogen is elemental hydrogen (i.e., $H_2$). As understood by those skilled in the art, elemental hydrogen is molecular dihydrogen, $H_2$. The elemental hydrogen may be in the form of a fluid, such as a gas or a compressed gas. In some such embodiments, elemental hydrogen is dissolved or suspended in a fluid (e.g., water, carbon dioxide). As noted above, the desired geologic hydrogen may be generated in situ within the subterranean formation. Specifically, in some cases, components of the rock formation (e.g., FeO) may facilitate the conversion of hydrogen within a molecule to elemental hydrogen.

While the majority of the embodiments disclosed herein are primarily described relative to subterranean formations, in some embodiments, rock tailings may also be used to generate geologic hydrogen. These rock tailings may comprise compositions corresponding to any of the noted hydrogen producing subterranean formations described herein including, for example, iron rich rock tailings with compositions similar to those noted above for subterranean formations. The rock tailings may be exposed to water and exposed to appropriate temperatures and/or pressures as noted previously above using any appropriate arrangement. For example, in some embodiments, rock tailings are disposed in a reaction container, disposed within a retention pond, or otherwise arranged such that the rock tailings may be exposed to water. Two or more electrodes may also be disposed in or otherwise placed in electrical communication with the rock tailings to control a temperature of the rock tailings using any of the methods disclosed herein relative to a subterranean formation. In the instance of rock tailings in a reactor, the reactor may include electrodes in electrical contact with an interior volume of the reactor. In instances where the rock tailings are disposed in a larger retention pond or other location where the rock tailings may be exposed to water (e.g., a pile of rock tailings with a water feed associated with the pile) the electrodes may be driven into, or alternatively placed into wells formed in the rock tailings. In either case, the two or more electrodes may pass a current between the electrodes through the rock tailings and/or water to heat the rock tailings to be within a temperature range appropriate for formation of geologic hydrogen, including any of the temperature ranges disclosed herein related to formation of hydrogen disclosed herein. Thus, hydrogen may be formed and released from the rock tailings for subsequent extraction and collection.

The rock tailings (e.g., particles of the rock tailings) may be relatively small in dimensions. In some embodiments, an average maximum cross-sectional dimension (e.g., an average diameter) of the rock tailings is less than or equal to 1 mm, less than or equal to 750 μm, less than or equal to 500 μm, less than or equal to 250 μm, or other appropriate dimension. In some embodiments, an average maximum cross-sectional dimension of the rock tailings is greater than or equal to 50 μm, greater than or equal to 100 μm, greater than or equal to 250 μm, greater than or equal to 500 μm, greater than or equal to 750 μm, or greater than or equal to 1 mm. Combinations of the foregoing range are also possible (e.g., less than or equal to 1 mm and greater than or equal to 50 μm). Other ranges are possible.

In some embodiments, rock tailings may exhibit a relatively large porosity which may facilitate their use in generating hydrogen. For example, an average porosity of the rock tailings may be greater than or equal to 50%. The average porosity may also be less than or equal to 10%. Combinations of the forgoing are contemplated including a porosity between or equal to 10% and 50%. Of course, other porosities are also possible.

While several embodiments of the present disclosure have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used. Those skilled in the art will recognize or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present disclosure is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Some embodiments may be embodied as a method, of which various examples have been described. The acts performed as part of the methods may be ordered in any suitable way. Accordingly, embodiments may be constructed in which acts are performed in an order different than illustrated, which may include different (e.g., more or less) acts than those that are described, and/or that may involve performing some acts simultaneously, even though the acts are shown as being performed sequentially in the embodiments specifically described above.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method for generating and extracting geologic hydrogen, the method comprising:

applying a current to a subterranean formation;

electrically fracturing the subterranean formation in response to the applied current;

injecting water into the subterranean formation;

reacting the injected water with iron from the subterranean formation to generate hydrogen; and extracting the hydrogen from the subterranean formation.

2. The method of claim 1, further comprising injecting a fluid into the subterranean formation prior to applying the current.

3. A method for generating and extracting geologic hydrogen, the method comprising:

injecting a fluid comprising carbon dioxide into a subterranean formation;

applying a current to the fluid within the subterranean formation to electrically fracture the subterranean formation;

depositing at least portion of the carbon dioxide of the fluid into the subterranean formation;

reacting the injected fluid with iron from the subterranean formation to generate hydrogen; and extracting the hydrogen from the subterranean formation.

4. The method of claim 2, further comprising fracturing the subterranean formation.

5. The method of claim 1, wherein electrically fracturing comprises forming new fractures within the subterranean formation that were not present prior to applying the current.

6. The method of claim 1, further comprising Joule heating at least a portion of the subterranean formation.

7. The method of claim 1, wherein the subterranean formation has a hardness of greater than or equal to 2 Mohs.

8. The method of claim 1, wherein the subterranean formation has a weight percentage of iron (Fe) greater than or equal to 1 wt %.

9. The method of claim 1, wherein the subterranean formation has a weight percentage of silicon (Si) greater than or equal to 1 wt %.

10. The method of claim 1, wherein a permeability of the subterranean formation prior to injecting the water is less than or equal to 10-12 $m^2$.

11. The method of claim 1, wherein a permeability of the subterranean formation prior to injection of the water is less than or equal to 10-20 $m^2$.

12. The method of claim 1, further comprising increasing a temperature of the subterranean formation between or equal to 25° C. and 500° C. to increase production of hydrogen.

13. The method of claim 1, further comprising increasing a temperature of the subterranean formation between or equal to 100° C. and 350° C. to increase production of hydrogen.

14. The method of claim 1, further comprising maintaining an average temperature of the subterranean formation that is greater than or equal to 0° C. and less than or equal to 500° C.

15. The method of claim 1, further comprising maintaining an average temperature of the subterranean formation that is greater than or equal to 250° C. and less than or equal to 350° C.

16. The method of claim 1, wherein the subterranean formation is a peridotite, iron-rich, olivine-rich, mafic, ultramafic, and/or massive sulfide rock formation.

17. The method of claim 1, wherein the subterranean formation comprises Si-bearing rocks, felsic rocks, silicic rocks, mafic rocks, ultramafic rocks, porphyry deposits, both high and low sulfidation epithermal deposits, skarn deposits, orogenic gold deposits, quartzite, sandstone, metapelites, metabasites, rhyolite, dacite syenite, monzonite, and/or granite.

18. A system comprising:
a power source;
at least two electrodes connected to the power source;
at least one pump; and
at least one processor configured to operate the power source and the at least one pump to perform the method of claim 1.

19. The method of claim 1, wherein a permeability of the subterranean formation after fracturing is increased by a factor of between or equal to 10 times and 100 times an original permeability of the subterranean formation prior to fracturing.

20. The method of claim 1, wherein a peak voltage applied when electrically fracturing the subterranean formation is between or equal to 100 kV and 800 kV.

21. The method of claim 3, further comprising injecting water into the subterranean formation to generate the hydrogen.

* * * * *